J. A. & E. C. ABEL.
JEWEL CLUSTER SETTING.
APPLICATION FILED AUG. 28, 191-
1,134,497.
Patented Apr. 6, 1915.
2 SHEETS—SHEET 1.
Fig. 1.
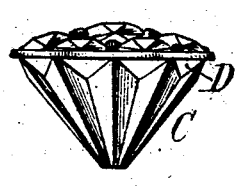
Fig. 2.
Fig. 6.
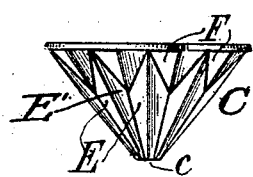
Fig. 3.
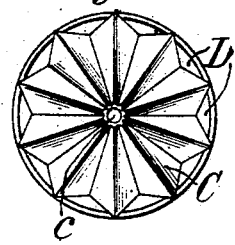
Fig. 4.
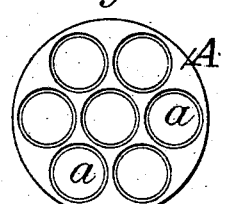
Fig. 7.
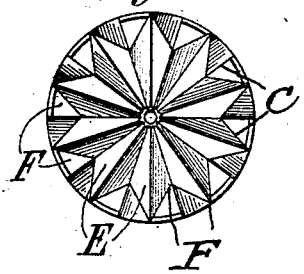
Fig. 8.
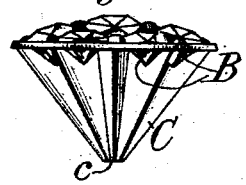
Fig. 5.
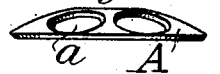
Fig. 10.
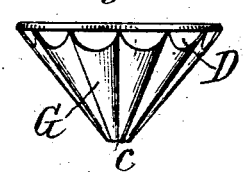
Fig. 9.
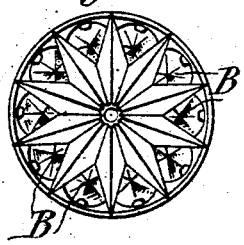
Fig. 14.
Fig. 12.
Fig. 11.
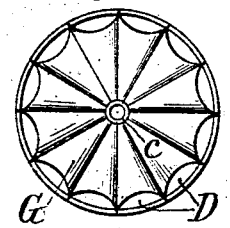
Fig. 13.
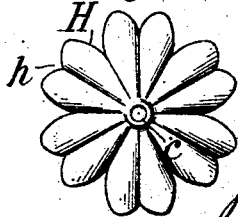
WITNESSES:
INVENTORS:
John A. Abel & Edward C. Abel
By Attorneys,
Fraser, Turk & Myers J. A. & E. C. ABEL.
JEWEL CLUSTER SETTING.
APPLICATION FILED AUG. 28, 1914.
1,134,497.                                             Patented Apr. 6, 1915.
                                                         2 SHEETS—SHEET 2.
Fig. 15.            Fig. 23.            Fig. 19.
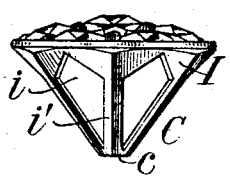 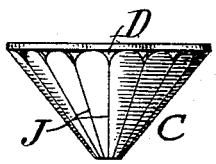 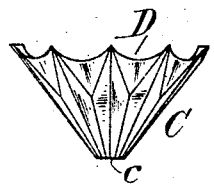
Fig. 16.                                Fig. 20.
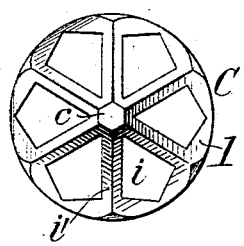                    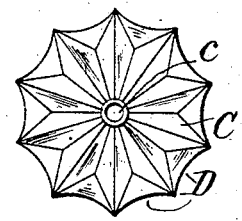
Fig. 17.                                Fig. 21.
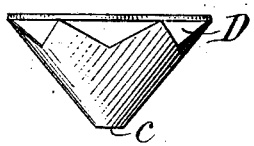                    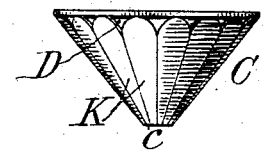
Fig. 18.                                Fig. 22.
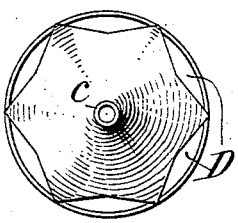                    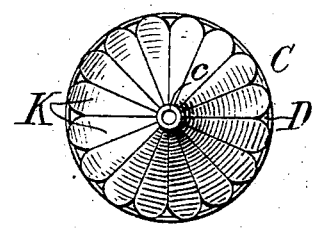
WITNESSES:                              INVENTORS:
René Pruine                             John A. Abel & Edward C. Abel
T. T. Wallace                              By Attorneys,
                                        Fraser, Turk & Myers

UNITED STATES PATENT OFFICE.

JOHN A. ABEL AND EDWARD C. ABEL, OF WOODHAVEN, NEW YORK.

JEWEL-CLUSTER SETTING.

1,134,437.

Specification of Letters Patent. Patented Apr. 6, 1915.

Application filed August 28, 1914. Serial No. 859,112.

*To all whom it may concern:*

Be it known that we, JOHN A. ABEL and EDWARD C. ABEL, citizens of the United States of America, residing at Woodhaven, in the county of Queens and State of New York, have invented certain new and useful Improvements in Jewel-Cluster Settings, of which the following is a specification.

Our invention relates to settings for precious stones such as diamonds wherein a number of small diamonds are mounted in a disk-shaped plate and has for its object to provide an improved setting of such character that the cluster of small stones so set will closely resemble in appearance, particularly when viewed from the side, a single stone.

In carrying our object into effect we have provided a frame work which is secured to the disk-shaped plate wherein the cluster of jewels is mounted and depends therefrom, which frame work in side view presents the appearance of the outline of a diamond below the girdle. Clusters of this character are usually mounted in a setting wherein the side of the setting is open so that in case a solitaire is mounted not only is the brilliancy of the stone enhanced by the admission of light to the portion below the girdle but also that portion of the stone below the girdle is seen from the side. This setting also has other advantages such as providing for the easy cleaning of the jewel.

Our invention aims to provide in a cluster setting a close simulation of a solitaire.

We are familiar with the fact that clusters have heretofore been mounted in a single plate but such mounting presents a flat appearance when viewed from the side, and does not give the desired effect. We are also familiar with the fact that such settings have been provided with wires depending therefrom, but such mounting owing to its extremely open character does not give its desired effect. We are also familiar with the fact that it has been proposed to place solid plates below the plate of such mountings, but such construction does not possess the advantages of our invention for the reason that to enable the stones to be cleaned from beneath, such a large proportion of the plates has been removed at the bottom that the desired resemblance to a single stone is lacking.

Our invention may be embodied in numerous forms and in the accompanying drawings we have illustrated the forms in which we may embody them.

Figure 1 illustrates in side elevation our preferred form. Fig. 2 is a vertical section thereof, and Fig. 3 a bottom view. Figs. 4 and 5 are top and side views respectively of the disk-shaped jewel plate. Figs. 6 and 7 are side and bottom views of a modified form of frame. Figs. 8 and 9 are similar views of a further modification. Figs. 10 and 11 are similar views of still another modification. Figs. 12 and 13 are similar views of another modification. Fig. 14 is a side elevation of another modified form. Figs. 15 and 16 are side elevations and bottom views respectively of another modified form. Figs. 17 and 18 are similar views of another modified form. Figs. 19 and 20 are similar views of another modified form. Figs. 21 and 22 are similar views of another modified form. Fig. 23 is a side elevation of a further modification.

In the employment of our invention we make use of a disk-shaped setting plate A which is usually provided with a plurality of small apertures $a$, one of which is situated in the center. These apertures are intended to receive the small stones B and the stone in the center aperture resembles the table of a diamond. Such mountings have usually been made in the form illustrated in Fig. 5 with the center slightly raised.

According to our invention we secure to the outside of this plate so that the same will depend therefrom a frame C. This frame is in substantially the form of an inverted cone having the base of the cone secured to the setting plate A so as to resemble the girdle of a diamond and so that the base of the cone will form the top of the frame. The frame may be secured to the plate by hard solder, by brazing, or in any other suitable manner. The said frame work depends from the plate and comes nearly to a point. A small portion of the apex of the cone is cut off at $c$ to resemble the culet of the diamond and an opening is therein provided by which the air inside of the frame C may be ventilated to prevent the condensation of moisture therein and at the same time if desired to assist in cleaning of the jewels B.

It is highly desirable while retaining the outline of a diamond below the girdle at the same time to admit light beneath the jewels so that their brilliancy shall be enhanced and preferably openings are provided for this purpose and through these openings the cleaning of the jewels may be accomplished. In all the various forms of our invention here illustrated the sides of the frame are substantially closed or so much so as to present in side view the outline of a diamond below the girdle. In all of them the apex of the cone is removed to resemble the culet of the diamond and in all of them an opening is provided at this point for the purposes stated. The openings for the admission of light and for the purpose of cleansing the stones from the side may be formed in the side of the frame in various ways. In the preferred form illustrated in Figs. 1, 2 and 3 the frame is provided with corrugations which extend from top to bottom thereof and at suitable points the material at the top of the frame (at the base of the cone) is removed forming openings D and through these openings the bottoms of the stones B may frequently be viewed if of sufficient size. A very desirable way of forming the openings is by cutting away the material between each corrugation so that the top of each corrugation forms the means for attaching the frame to the plate and the intermediate points are cut away for the purposes stated.

In all the forms of our invention the frame is preferably highly polished and in those forms wherein a metal frame work is employed the same is preferably made in the form of a thin shell as is illustrated in Fig. 2, and may well be formed of some highly reflecting metal such as platinum. By the employment of the corrugated form of Figs. 1, 2 and 3 a considerable amount of reflection is produced which strongly aids the resemblance to the appearance of a single stone in side view. In Figs. 6 and 7 the frame C is likewise corrugated as in Figs. 1, 2 and 3, but portions of the frame work are cut away as at E and F, and such cut away portions are illustrated as being cut out in the form of a part of a diamond-shaped figure. For instance it will be perceived that the part E is cut out as one-half of a diamond-shaped figure and this is cut from one side of a corrugation. The part F is represented as one side of a half diamond-shaped figure formed by corrugations between the ends of the diamond-shaped figures and this is cut from the side of the corrugation. The cut portions E and the uncut portions E¹ together form a diamond-shaped figure. This somewhat facilitates the production of the desired effect.

In Figs. 8 and 9 the frame C is provided with corrugations which extend from top to bottom thereof, and these corrugations are deep enough to permit the bottom of the stones B to appear. In this form therefore it will not be necessary to cut away the top of the frame as openings for the admission of light and for the purpose of cleansing the stones B are provided by the depth of the corrugations which as shown in the bottom view (Fig. 9) are ample for this purpose. The light being reflected from the sides of the corrugations against the jewels will give a very desirable brilliancy thereto.

In Figs. 10 and 11 the frame C is provided with fluted or rounded corrugations G which are cut away at the top at D for the purpose of admitting light and providing for cleaning of the stones and are cut away at the bottom at c for the reasons heretofore stated.

In Figs. 12 and 13 the frame work C is somewhat similar to that illustrated in Figs. 10 and 11 but the cut away portions form alternately small deep V-shaped figures H and shallow V-shaped figures h.

In Figs. 15 and 16 the frame C is provided with flat panels I, each of which is preferably formed with a small diamond-shaped opening i through which light may be admitted and the jewels cleaned, etc. The opening c is provided as usual. In this form the frame between the cut away portions i provides bars i¹ which are of substantial width as seen in the bottom view (Fig. 16) and as seen from the sides such bars have sufficient substance to present substantially the appearance of the outline of a diamond.

In Figs. 17 and 18 a further form is illustrated of substantially the shape of an inverted truncated cone. The truncation is formed by the removal of the material at c for the purposes stated. This form of our invention has the openings D formed by a succession of cuts which may be V-shaped as in Fig. 17 or they may be formed as illustrated in Fig. 14, wherein the same cone-shaped body has U-shaped cuts at the top to form the openings D. In either of these forms the plain surface of the cone may be embellished or ornamented by engraving if desired as illustrated in Fig. 23, wherein a similar frame is employed which is embellished on its side with lines J which extend from top to bottom. In this case the openings D are formed substantially above the lines J and the portion of the frame between adjacent lines J is substantially semicircular.

In Figs. 22 and 23 the frame C is illustrated as formed into a number of narrow flat panels or vanes K each of which is cut at the top to a rounded outline forming V-shaped openings D, which together with the opening c are provided for the purposes stated.

The frames so far described by us are preferably formed of metal such as platinum in the hollow form of Fig. 2, but our invention is not necessarily limited to the employment of such metal and to illustrate the variety of material which may be employed we have shown in Figs. 19 and 20 a construction formed of rock crystal. Here the frame C is preferably cut on its sides to resemble the cutting of the diamond below the girdle and at the culet an opening is drilled therein at c for the purposes stated. In this form I have illustrated rounded openings D as being provided. The surface of the crystal is highly polished and presents a decidedly pleasing appearance to the eye owing to the refraction of the light. Rock crystal or glass may be employed as desired and will admit the maximum amount of light to the under side of the jewels B at the same time permitting the cleansing thereof and presenting the appearance of a solitaire from the side.

If desired, the rock crystal or glass backing unit may be lined with any mirror reflecting material or metal to make it look more brilliant. We may also employ as a backing any gem scientific or reconstructed as desired, or a white sapphire may be employed or a moonstone or topaz. Our invention is likewise applicable for use in connection with gems of any character, diamonds, rubies or sapphires, or even imitation rubies or sapphires, and in short in any case where it is desired to gain the appearance in side view of a solitaire. The number of stones contained in the cluster are immaterial; there may be any number from three to eleven, or more.

The invention may be further used to good advantage as a backing to any rose cut gem that has a flat rear surface, or it may be used as a backing for reconstructed gems or scientific gems.

It will be perceived that our invention is not necessarily limited to the particular shape or configuration of frame employed as the same may be changed in various ways as desired within the limits of the appended claims.

What we claim is:—

1. A jewel cluster setting comprising a setting plate adapted to receive a plurality of single jewels and a frame work secured to said plate, and depending therefrom, said frame work having its sides substantially closed but provided with small openings therein to admit light and permit cleaning the jewels, said frame work tapering toward its bottom and having a small opening at the bottom to provide ventilation.

2. A jewel cluster setting comprising a setting plate having a plurality of apertures for single jewels and a frame work secured to said plate and depending therefrom, said frame work having its outer surface polished and having its sides tapering toward the bottom and substantially closed but provided with small openings therein to admit light and permit cleaning the jewels and having a small opening at the bottom to provide ventilation, said frame work when the setting is viewed from the side presenting the appearance of a diamond below the girdle.

3. A jewel cluster setting comprising a disk-shaped plate having a plurality of apertures for single jewels and a frame work secured to said plate and depending therefrom, said frame work having its sides tapered and formed in substantially the shape of the facets of a diamond below the girdle and substantially closed but provided with small spaces between the plate and the frame to permit cleaning the jewels, and having a small opening at the bottom to provide ventilation.

4. A jewel cluster setting comprising a disk-shaped plate having a plurality of apertures for single jewels and a frame work of substantially inverted cone shape secured to said plate and depending therefrom, said frame work having portions removed at its upper part or the base of the cone forming openings to permit cleaning the jewels and having a small opening at the bottom or apex of the cone to provide ventilation.

5. A jewel cluster setting comprising a disk-shaped plate having a plurality of apertures for single jewels, and a frame work secured to said plate and depending therefrom, said frame work having corrugations extending from top to bottom thereof, and portions of the frame being removed from the top providing openings to admit light and permit cleaning the stones and having a small opening at the bottom to provide ventilation.

6. A jewel cluster setting comprising a disk-shaped plate having a plurality of apertures for single jewels and a frame work secured to said plate and depending therefrom, said frame work tapering toward its bottom and having its sides substantially closed and having corrugations extending from top to bottom thereof, and portions of the frame being removed from the top providing openings to admit light and permit cleaning the stones, and having a small opening at the bottom to provide ventilation.

7. A jewel cluster setting comprising a disk-shaped plate having a plurality of apertures for single jewels and a frame work secured to said plate and depending therefrom, said frame work tapering toward its bottom and having corrugations extending from top to bottom thereof, and portions of the frame being removed from the top at each corrugation providing openings to admit light and permit cleaning the stones, and having a small opening at the bottom to provide ventilation.

8. A jewel cluster setting comprising a setting plate adapted to receive a plurality of single jewels, a frame work secured to said plate and depending therefrom, said frame work having its sides substantially closed, but provided with small openings therein to admit light and permit cleaning the jewels, said frame work having substantially the shape of an inverted cone with a small portion of the bottom of the frame, corresponding to the apex of the cone, removed.

In witness whereof, we have hereunto signed our names in the presence of two subscribing witnesses.

JOHN A. ABEL.
EDWARD C. ABEL.

Witnesses:
SARAH LYNN,
LILLIAN GUNDERSEN.